(12) United States Patent
Yokoyama et al.

(10) Patent No.: US 6,599,543 B1
(45) Date of Patent: Jul. 29, 2003

(54) PROCESS FOR PREPARING FERMENTED SOYBEAN MILK

(75) Inventors: Hitoshi Yokoyama, Izumisano (JP); Keiji Miyata, Izumisano (JP); Hideo Sugano, Izumisano (JP); Haruo Tsumura, Izumisano (JP)

(73) Assignee: Fuji Oil Company, Limited, Osaka-fu (JP)

( * ) Notice: Subject to any disclaimer, the term of this patent is extended or adjusted under 35 U.S.C. 154(b) by 0 days.

(21) Appl. No.: 09/009,536

(22) Filed: Jan. 21, 1998

(30) Foreign Application Priority Data

Jan. 22, 1997 (JP) .............................. 9-009314
Sep. 12, 1997 (JP) .............................. 9-248324
Oct. 21, 1997 (JP) .............................. 9-288626

(51) Int. Cl.$^7$ ................................ A23B 9/28
(52) U.S. Cl. ..................................... 426/46
(58) Field of Search ..................... 426/34, 42, 43, 426/49, 52, 615, 629, 634, 46

(56) References Cited

U.S. PATENT DOCUMENTS 5,597,594 A * 1/1997 Matsuura et al. ............. 426/44
5,711,977 A * 1/1998 Yang et al. ................... 426/61

FOREIGN PATENT DOCUMENTS

DE    31 25 797 A    1/1983
DE    35 09 239 A    9/1986
EP    0 344 786 A    12/1989

OTHER PUBLICATIONS

Country Life Online: The Lactobacillus Bar, Archive: Apr. 1996.
Patent Abstracts of Japan, vol. 095, No. 010, Nov. 30, 1995 & JP 07 184540 A (Yukijirushi Lorry KK), Jul. 25, 1995 * abstract *.
J.L. Hernandez et al., Predigested Soybeans, Journal of the American Oil Chemist's Society, vol. 58, No. 3, 1981 pp. 510–511, XP002064327 * abstract *.

* cited by examiner

Primary Examiner—Keith Hendricks
(74) Attorney, Agent, or Firm—Wenderoth, Lind & Ponack, L.L.P.

(57) ABSTRACT

Disclosed is a process for preparing a fermented soybean milk comprising the steps of: inoculating a lactic acid bacterium of the genus Bifidobacterium, *Lactobacillus bulgaricus* and one strain selected from the group consisting of *Lactobacillus acidophilus* and *Lactobacillus casei* into soybean milk, and fermenting the same. According to the process of the present invention, lactic acid bacteria fermented soybean milk with great flavor can be provided.

11 Claims, No Drawings

PROCESS FOR PREPARING FERMENTED SOYBEAN MILK

BACKGROUND OF THE INVENTION

1. Field of the Invention

The present invention relates to a process for preparing a fermented soybean milk.

2. Description of the Related Art

Recently, vegetable protein has attracted public attention from the point of view of health. Especially, soybean milk, which is made from soybean, containing good quality protein but not cholesterol, has attracted a great deal of public attention as a health food.

However, there are some problems in using the soybean milk. For example, the soybean milk has an unpalatable taste such as grassy smelling and stimulating taste due to minor components from soybean such as 2-hexenal and several saponins.

In order to improve the flavor of soybean milk, some methods including a step of fermenting soybean milk with lactic acid bacterium have been proposed, for example, in Japanese Laid Open Patent Applications Nos. SHO 61-141840, SHO 62-205735, SHO 63-7743, SHO 63-276979, HEI 2-167044, HEI 6-276979 and HEI 8-66161. However, the products obtained by these known methods still have some problems such as insufficient masking of the unfavorable soybean flavor, unpleasant fermentation flavor, and a disappearance of the soybean's body and taste.

For the purpose of solving these problems, the inventors have tried to ferment soybean milk with various strains of lactic acid bacteria, and have found that lactic acid bacterium of the genus Bifidobacterium is useful to improve the unpleasant flavor peculiar to soybean without adding components other than soybean. However, when the inventors *Lactobacillus bulgaricus*, which had been known to have flavor improving ability, in addition to Bifidobacterium bacteria, the former bacteria could not grow well in soybean milk. When saccharides that are utilized by lactic-acid bacteria were added to the soybean milk, *Lactobacillus bulgaricus* could grow well in soybean milk, but the flavor of the obtained fermented soybean milk was not improved sufficiently.

On the other hand, the conventional lactic-acid fermented soybean milk has a problem that it generates reverse odor of soybean during cold storage. Therefore, conventional products are heat-treated so that the bacteria in the products are destroyed. However, the heat treatment causes aggregation of the product or generation of unpleasant taste.

SUMMARY OF THE INVENTION

One object of the present invention is to provide lactic-acid fermented soybean milk having an improved total flavor without the unpleasant flavor of conventional soybean milk.

The present invention provides a process for preparing fermented soybean milk comprising the steps of: inoculating a lactic acid bacterium of the genus Bifidobacterium, *Lactobacillus bulgaricus* and one strain selected from the group consisting of *Lactobacillus acidophilus* and *Lactobacillus casei* to soybean milk, and fermenting the same.

Soybean milk used in the present invention is preferably one obtained by the process comprising the steps of contacting dehulled and dehypocotyl whole soybeans with warm or hot water; removing the warm or hot water-soluble component from the soybeans; pulverizing the soybeans to make a slurry, and removing the insoluble component from the slurry.

Another object of the present invention is to provide a lactic-acid fermented soybean milk, which can be stored longer without the problem of reversed odor of soybean. The present invention also provides a process for producing lactic acid fermented soybean milk further comprising the step of introducing the lactic acid fermented soybean milk into an container made of a material having an oxygen permeability of below 100 cc/ m$^2$/24 hr/atm (25 μm, 25° C., 50% RH).

DESCRIPTION OF THE PREFERRED EMBODIMENT

In the present invention, soybean milk may be one obtained from whole or defatted soybeans according to any conventional method and may be any conventional commercially available soybean milk. For example, soybean milk can be obtained by the process comprising the steps of impregnating whole soybeans or dehulled soybeans with water by immersing them into water or any other procedure, pulverizing the same with water to make a slurry and removing the insoluble portion of the slurry by a method such as filtration, to provide soybean milk.

The soybeans employed in the present invention may be whole or defatted soybeans, preferably dehulled soybeans, and more preferably dehulled and dehypocotyl soybeans. According to the present invention, it is preferred to remove the hot or warm water-soluble portion of the soybeans by contacting the same with the hot or warm water and then separating and removing the water phase containing the portion eluted in the water. Said portion may contain isoflavone, sapogenin and saccharides. In the case of whole soybeans, the soybeans may be contacted with water at a temperature of about 50 to 100° C. for about 30 minutes to 10 hours. In the case of dehulled and dehypocotyl soybeans, the temperature of the water may be about 20 to 100° C. and the contacting time may be about 20 minutes to 10 hours. Most preferably, the hot or warm water-soluble portion may be removed from the soybeans so that said portion remaining in the soybean milk is no more than 20 percent, preferably, no more than 15 percent by weight of the dried solid portion of the obtained soybean milk.

According to the present invention, the pH of the hot or warm water with which the soybeans are contacted may be from neutral to weakly alkaline.

Preferably, the pH is weakly alkaline in order to avoid stimulating taste due to the effect of β-glucosidase. Any food additive, which can adjust the pH to weakly alkaline, may be employed to control the pH. For example, a salt of an organic acid such as sodium dioxide carbonate and sodium carbonate is preferably used from the point of view of flavor.

After that, the treated soybeans are pulverized in water to make a slurry and then, soybean milk can be obtained by separating and removing the insoluble portion from the slurry.

The step of pulverizing the soybeans may be conducted at room temperature. However, in order to prevent degradation of the product during the pulverizing step due to lipoxygenase, peroxidase or β-glucosidase, it is preferable to carry out the step at a temperature of below about 10° C. or above about 80° C.

The obtained slurry may be kept above about 80° C. and then may be separated into okara and soybean milk by any conventional means such as filtration, decanting, centrifugation or the like.

The soybean milk obtained as above may be sterilized by, for example, heating it to about 135 to 150° C. for about 1 to 120 seconds before fermentation.

Since the soybean milk obtained as above has good flavor, it will provide good flavor to the fermented soybean milk of the present invention. In addition, because of the relatively small concentration of saccharides, it is easy to control the fermentation of the soybean milk by adding saccharides to the same, which saccharides are utilized by lactic-acid bacteria.

It is preferable to add some saccharides, which are utilized by lactic-acid bacteria, to the soybean milk to promote fermentation. Any saccharides utilized by lactic-acid bacterium may be employed, and oligo saccharides are preferable. When oligo saccharides are employed, they may be added to the soybean milk in an amount of about 0 to 5%, preferably, 1 to 2% by weight of the soybean milk. In addition, bifidus factor may be added to the soybean milk.

The lactic-acid bacterium of the genus Bifidobacterium used in the present invention may be any strain belonging to said genus. For example, *B. bifzdum, B. longum, B. breve, B. infantis*, and *B. animalis* may be used for the present invention. However, from the point of view of health, it is preferable to use bacterium occurring in human, i.e. other than *B. animals*.

*Lactobacillus bulgaricus* used in the present invention may be any of the known strain and these are commercially available.

Both of *Lactobacillus acidophilus* and *Lactobacillus casei* used in the present invention may be any of the known strains and these are commercially available.

It has been known that *Lactobacillus bulgaricus* grows very well in cow milk but not in soybean milk. Therefore, when it was inoculated to soybean milk together with lactic acid-bacteria of the genus Bifidobacterium, it could not grow well enough and therefore, could not improve the flavor. The inventors however found that, when either *Lactobacillus acidophilus* or *Lactobacillus casei* is inoculated into the soybean milk in addition to these other two bacteria, *Lactobacillus bulgaricus* grew well in the soybean milk and improved the flavor of the resulting fermented soybean milk.

In general, soybean milk fermented with a lactic-acid bacterium of the genus Bifidobacterium alone contains unfavorable components produced during fermentation, such as acetic acid and diacetyl, which generate a cheese like odor. According to the present invention, such unpleasant odor or flavor are masked or reduced by culturing the soybean milk with the combination of these three bacteria, and a pleasant fermenting flavor may be generated.

These three bacteria may be inoculated all together to the soybean milk for lactic-acid fermentation, or the soybean milk may be fermented with the respective bacterium separately and then mixed together. It is preferred to inoculate them together.

According to the present invention, these bacteria may be purely cultured before inoculation to form so to speak "bulk" starters. Alternatively, freeze-dried bacteria or freeze-dried concentrated bacteria may be inoculated directly into the soybean milk.

The dosage of the inoculation may vary depending on the temperature or time of the fermentation step. For example, the total amount of bulk starters inoculated to the soybean milk may be about 0.5 to 15%. The freeze-dried bacteria may be inoculated so that the starting concentration of total lactic-acid bacteria is above about $10^5$ cells/ml.

Then, the inoculated soybean milk may be fermented at about 20 to 50° C., for about 3 to 48 hours, preferably at about 25 to 45° C. for about 4 to 24 hours. Fermentation may be carried out with any conventional device or fermentation tank used for producing fermented cow milk.

In one embodiment of the present invention, the soybean milk may be fermented under the condition that the fermentation atmosphere is substantially free of oxygen, that the oxygen concentration of the atmosphere is lower than 5.0%, preferably lower than 3.0%. By fermenting under such a low oxygen atmosphere, the fermented soybean milk of this embodiment may be free from unfavorable odor peculiar to soybeans, and can obtain a body like that of cow milk and a good flavor.

In order to adjust the oxygen concentration during fermentation, the soybean milk inoculated with the lactic-acid bacteria may be introduced into an airtight container and fermented therein so that there is no room for air. Alternatively, the oxygen concentration of the atmosphere, such as the headspace of the container or fermentation tank, may be reduced.

In order to reduce the oxygen concentration of the atmosphere, deoxygenating agent, evacuation procedure or gas exchanging procedure may be employed and the gas exchanging procedure is most preferable. In the present invention, the gas used for exchanging the atmosphere is not limited. For example, an inert gas such as rare gas, nitrogen gas and carbon dioxide can be used for this procedure. Nitrogen gas and carbon dioxide are preferable because they are safe for food.

During fermentation, the concentration of oxygen dissolved in the soybean milk is not so important as the oxygen concentration of the atmosphere, and may vary depending on the temperature of the soybean milk or the pressure of the atmosphere. Preferably, the concentration is below about 2.0 ppm. The lower the oxygen concentration of the soybean milk is, the better will be flavor of the product. In order to reduce the amount of oxygen dissolved in the soybean milk, a vacuum deodorization machine such as a vacuum chamber may be employed.

The obtained fermented soybean milk of the present invention may be stirred and cooled, and then introduced into a container to provide a soft type yogurt-like product, or homogenized and cooled to provide a yogurt-like drink product. The products obtained according to the present invention can be combined with any conventional flavor, sweetener, colorant and stabilizing agent as desired. In addition, the products can be combined with a fruit preparation to provide a fruit type product.

In one embodiment of the present invention, the fermented soybean milk is stored in a container having oxygen permeability of less than 100 ml/m²/24 hr/atom (at 25 μm, 25° C., 50% RH), preferably, less than 10 cc/m²/24 hr/atom (at 25 μm, 25° C., 50% RH). Due to the low permeability of the container, the lactic-acid fermented soybean milk can be protected from contacting outside oxygen and, therefore, the product can be protected from the generation of reverse odor of soybeans.

The container having such a low oxygen permeability may be made from materials such as glass (less than 0.1) or resins. Examples of resins include polyvinyl chloride (PVC) (1), poly vinylidene chloride (PVDC)(1), ethylene-vinyl-alcohol copolymer (EVOH)(2), polyethylene terephtalate coated with polyvinylidene chloride (K-PET)(20), ceramic vacuum evaporated PET (0.2), and aluminum vacuum evaporated PET (0.2) (each number after the name represents the respective oxygen permeability rate cc/m²/24 hr/atm (at 25 μm, 25° C., 50% RH)). The container may be any form as long as made of the materials listed above. It may be a container made from glass, plastic resin, plastic resin+paper plastic film, paper plastic film, metal such as aluminum, and metal+plastic film. The lid of the container should also be made from one of the above listed material. From the environmental point of view, however, some of these materials have disadvantages for example, used glass containers are difficult to collect and aluminum vacuum evaporation requires a high burning energy. The most preferable container is made from a combination of paper and plastic film having oxygen barrier property (so called multi layer structure). Examples of a plastic film having oxygen barrier property include ceramic vacuum evaporated PET (0.2 cc/m²/24 hr/ atm), EVOH-PET (2 cc/m²/24 hr/atm), K-coating PET (20 cc/m²/24 hr/atm) but are not limited to them.

According to the present invention, the soybean milk inoculated with the specified lactic-acid bacteria may be introduced into the above container, and fermented and stored. Alternatively, the inoculated soybean milk may be fermented in a fermentation tank and then the product may be added to the container.

In this embodiment, the good flavor of the lactic-acid bacteria fermented soybean milk can be kept over 2 weeks when stored in the cold, at a temperature between about 0 and 10° C.

In the present invention, the lactic-acid bacteria contained in the fermented soybean milk should be active and the concentration of the active bacteria is preferably more than 1 million cells per 1 ml. In order to keep the good flavor of the lactic-acid fermented soybean milk longer, the concentration of bacteria other than lactic acid bacteria is preferably less than 10 cells per 1 ml. To eliminate contamination of the bacteria, it is preferable to add the lactic-acid fermented soybean milk to the container specified as above under a germ free condition, for example with the use of an aseptic filling up device.

It is preferable to fill up the container with the fermented soybean milk in order that the fermented soybean milk is prevented from contacting oxygen. In case there is some headspace in the container, the space is preferably filled with an inert gas for example, nitrogen gas.

EXAMPLE

The following examples are included merely to aid in the understanding of the invention, and variations may be made by one skilled in the art without departing from the spirit and scope of the invention.

Example 1 and Comparative Example 1

Commercially available soybean milk (solid portion: 9%) was heated to 142° C. for 5 seconds and cooled to 40° C. Three per cent by volume of the cultured freeze dried lactic acid bacteria mixture listed on Table 1 below was inoculated to the soybean milk and the mixture was added in a small container made by plastic. The mixture was cultured at 40° C. until the pH of the mixture became 4.4 (for about 6–24 hours) and cooled to 5° C. to obtain lactic acid fermented soybean milk.

Organoleptical evaluation to evaluate grassy smell, stimulating taste and general taste was carried out by panelists.

The results are shown in Table 1.

TABLE 1

| lactic acid bacteria | Example 1-1 | Example 1-2 | Comparative Ex. 1-1 | Comparative Ex. 1-2 | Comparative Ex. 1-3 |
|---|---|---|---|---|---|
| B.L. | 1% | 1% | 1% | 1% | — |
| L.B. | 1% | 1% | 1% | — | 1.5% |
| L.A. | — | 1% | — | — | — |
| L.C. | 1% | — | — | — | — |
| Sc.t | — | — | 1% | — | 1.5% |
| grassy smell | — | — | — | — | — |
| stimulating taste | — | — | — | — | — |
| general taste | ⊚–○ | ○ | Δ | Δ | X |

Abbreviations:
B.L.: *Bifidobacterium longum*, L.B.: *Lactobacillus bulgaricus*;
Sc.t: *Streptococcus thermopnilus*; L.A.: *Lactobacillus acidophilus*;
L.C.: *Lactobacillus casei*
++: strong, +: mild, ±: slightly, –: none
⊚: very good, ○: good, Δ: slightly bad, X: bad According to the results shown in Table 1, lactic acid bacterium of the genus Bifidobacterium grew very well in soybean milk and was effective to remove unfavorable taste such as grassy smell or stimulating taste. However, the fermented soybean milk obtained with said bacteria alone did not reach to the satisfactory level of total flavor. Fermented soybean milk preparations obtained with the combination of *Lactobacillus bulgaricus* and *Streptococcus thermophilus* or the combination of *Bifidobacterium longum*, *Lactobacillus bulgaricus* and *Streptococcus thermophilus* did not have a satisfactory general taste. In contrast, the combination of *Bifidobacterium longum*, *Lactobacillus bulgaricus* and *Lactobacillus acidophilus*, and the combination of *Lactobacillus longum*, *Lactobacillus bulgaricus* and *Lactobacillus casei* provided fermented soybean milk with very good taste.

Example 2

Effect of removing warm or hot water-soluble portion and adding oligo saccharides was determined.

One part by weight of dehulled soybeans was immersed in seven parts by weight of water (50° C.) for three hours and the water was removed. After water was drained, one part of the obtained soybeans were pulverized with four parts by weight of hot water (95° C.) to obtain a slurry. The slurry was heated to 98° C. for 30 minutes and cooled to 80° C. Then, okara was removed from the slurry to provide soybean milk using a screw decanter. The obtained soybean milk was sterilized by heating to 145° C. for 4 seconds and then cooled to 40° C. The amount of hot or warm water-soluble saccharide contained in the soybean milk was 0.7% by weight of the soybean milk.

The soybean milk obtained as above was adjusted to contain 9 wt % of solid portion. The soybean milk then contained hot or warm water-insoluble portion in an amount of 7% by weight of the dried solid portion of the same. One % of a fructo oligo saccharide (trademark "MEI OLIGO P", manufactured by Meiji Seika Kabushiki Kaisha, Japan) was added to the soybean milk. Respective cultures of commercially available lactic acid bacteria, *Bifidobacterium longum*, *Lactobacillus bulgaricus* and *Lactobacillus acidophilus* were added to the soybean milk as starter. The inoculated soybean mixture was added to a small container made by plastic.

The container filled with the inoculated soybean milk was cultured at 40° C. for 7 hours and cooled to 5° C. to provide a fermented soybean milk.

As a comparative example, fermented soybean milk was prepared in the same manner as above except for using a combination of *Bifidobacterium longum, Streptococcus thermophilus* and *Lactobacillus bulgaricus*. The obtained fermented soybean milk preparations were subjected to organoleptical evaluation by panelists to evaluate grassy smell, stimulating taste and general taste. The results are shown in the Table 2.

TABLE 2

|  | Example 2 | Comparative Ex.2 |
|---|---|---|
| pH | 4.35 | 4.46 |
| grassy smell | none | rarely detectable |
| stimulating taste | rarely detectable | rarely detectable |
| others | little of rough flavor | musty |
|  | tasty | not so tasty |
| general evaluation | ⊚–◯ | X |

The fermented soybean milk obtained in Example 2 had clearer and better taste than that of Example 1–2 without the warm or hot water soluble portion, i.e. the saccharide removing process of Example 2.

Example 3

The fermented soybean milk obtained in the same manner as Example 2, was homogenized by a mixer and combined with 17 parts by weight of strawberry jam (brix degree is 35), 0.6 parts by weight of gelatin and a suitable amount of yogurt flavor to provide a fruit yogurt-like product.

The obtained fruit yogurt-like product had a better taste and flavor than conventional fermented soybean milk product, and had a cow milk yogurt-like structure.

What is claimed is:

1. A process for preparing a fermented soybean milk comprising:

contacting dehulled and dehypocotyl whole soybeans with warm or hot water;

removing warm or hot water-soluble component from the soybeans;

pulverizing the soybeans to make a slurry;

removing insoluble component from the slurry to make a soybean milk, inoculating a lactic acid bacterium of the genus Bifidobacterium, *Lactobacillus bulgaricus* and one strain selected from the group consisting of *Lactobacillus acidophilus* and *Lactobacillus casei* into the soybean milk, adding one or more saccharides which can be utilized by the lactic acid bacterium to the soybean milk, and fermenting the soybean milk to produce the fermented soybean milk.

2. The process of claim 1, wherein said warm or hot water-soluble component is removed so that the amount of the warm or hot water-soluble component contained in the soybean milk is less than 20 wt % of the dried solid component of the soybean milk.

3. The process of claim 1, wherein said warm or hot water is adjusted to weakly alkaline by adding a salt of an organic acid.

4. The process of claim 3, wherein said salt of an organic acid is sodium hydrogencarbonate or sodium carbonate.

5. The process of claim 1, wherein the one or more saccharides are oligosaccharides, and said oligosaccharides are added in an amount of 1 to 5 wt % of the soybean milk.

6. The process of claim 1, wherein the fermenting step is carried out in an atmosphere comprising an oxygen concentration equal to or less than 5% (v/v).

7. The process of claim 6, wherein the oxygen concentration is controlled by exchanging the gas of the atmosphere.

8. The process of claim 6, wherein the oxygen concentration dissolved in the soybean milk is no more than 2 ppm.

9. The process of claim 1 further comprising introducing the fermented soybean milk into a container made from a material having an oxygen permeability of below 100 cc/m$^2$/24 hr/atm (25 um, 25° C., 50% RH).

10. The process of claim 9, wherein the headspace of said container is filled with inert gas.

11. The process of claim 9, wherein said material is a multi layer structure film.

* * * * *

UNITED STATES PATENT AND TRADEMARK OFFICE
CERTIFICATE OF CORRECTION

PATENT NO. : 6,599,543 B1
DATED : July 29, 2003
INVENTOR(S) : Hitoshi Yokoyama et al.

It is certified that error appears in the above-identified patent and that said Letters Patent is hereby corrected as shown below:

Title page,
Item [*] Notice, should read
-- Subject to any disclaimer, the term of this patent is extended or adjusted under 35 U.S.C. 154(b) by 488 days. --

Signed and Sealed this

Seventh Day of September, 2004

JON W. DUDAS
*Director of the United States Patent and Trademark Office*